(12) United States Patent
Bifulco et al.

(10) Patent No.: US 10,648,481 B2
(45) Date of Patent: May 12, 2020

(54) FIBER REINFORCED SPACER FOR A GAS TURBINE ENGINE

(71) Applicant: UNITED TECHNOLOGIES CORPORATION, Farmington, CT (US)

(72) Inventors: Anthony R. Bifulco, Ellington, CT (US); Damon K. Brown, Middletown, CT (US); Nicholas Aiello, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1037 days.

(21) Appl. No.: 14/929,701

(22) Filed: Nov. 2, 2015

(65) Prior Publication Data

US 2016/0153463 A1 Jun. 2, 2016

Related U.S. Application Data

(60) Provisional application No. 62/080,861, filed on Nov. 17, 2014.

(51) Int. Cl.
*F02C 1/00* (2006.01)
*F04D 29/32* (2006.01)
(Continued)

(52) U.S. Cl.
CPC ............. *F04D 29/321* (2013.01); *F01D 5/02* (2013.01); *F01D 25/28* (2013.01); *F02C 3/06* (2013.01);
(Continued)

(58) Field of Classification Search
CPC ............. F01D 5/284; F01D 5/28; F01D 5/282
See application file for complete search history.

(56) References Cited

U.S. PATENT DOCUMENTS

| 3,554,667 A | 1/1971 | Wagle |
| 4,804,427 A * | 2/1989 | Paul ........................ B29C 70/50 |
| | | 156/180 |

(Continued)

FOREIGN PATENT DOCUMENTS

| DE | 102012014109 A1 | 1/2014 |
| EP | 1264964 A1 | 12/2002 |

(Continued)

OTHER PUBLICATIONS

English Abstract for DE102012014109A1—Jan. 23, 2014; 1 pg.

(Continued)

*Primary Examiner* — Gerald L Sung
(74) *Attorney, Agent, or Firm* — Cantor Colburn LLP

(57) ABSTRACT

A spacer of a gas turbine engine is reinforced with a fiber. The fiber can be cured with a substrate to form a fiber reinforced composite material. As a gas turbine engine operates, the rotation creates forces which can deform, expand, contract or translate certain gas turbine engine components, including spacers. These forces can adversely affect gas turbine engine performance and reliability, particularly when they are either unpredictable or difficult to control. Reinforcing a spacer with a fiber may allow a lower system weight, more compact or configurable internal packaging or a high degree of reinforcement.

14 Claims, 5 Drawing Sheets

(51) Int. Cl.
*F01D 5/02* (2006.01)
*F01D 25/28* (2006.01)
*F02C 3/06* (2006.01)

(52) U.S. Cl.
CPC ...... *F05D 2220/32* (2013.01); *F05D 2240/24* (2013.01); *F05D 2300/6032* (2013.01); *F05D 2300/614* (2013.01)

(56) References Cited

U.S. PATENT DOCUMENTS

| | | | | |
|---|---|---|---|---|
| 5,222,296 | A * | 6/1993 | Doorbar | B23P 15/006 228/194 |
| 5,470,524 | A * | 11/1995 | Krueger | B22F 5/009 419/10 |
| 5,632,600 | A * | 5/1997 | Hull | F01D 5/06 416/198 A |
| 6,162,019 | A * | 12/2000 | Effinger | F01D 5/025 416/229 A |
| 7,766,623 | B2 * | 8/2010 | Chou | B23K 20/129 29/889.23 |
| 7,811,062 | B1 * | 10/2010 | Twigg | F01D 5/147 416/218 |
| 2002/0165332 | A1 * | 11/2002 | Pope | C01B 21/0637 528/25 |
| 2005/0254950 | A1 * | 11/2005 | Mons | F01D 5/06 416/201 R |
| 2007/0086896 | A1 * | 4/2007 | Aumont | C22C 49/00 416/229 R |
| 2008/0025844 | A1 * | 1/2008 | Bayer | C22C 47/00 416/221 |
| 2010/0150725 | A1 * | 6/2010 | Krautheim | B23P 15/006 416/219 R |
| 2011/0014041 | A1 | 1/2011 | Lhoest | |
| 2011/0059290 | A1 * | 3/2011 | Gage | B23K 1/0018 428/99 |
| 2012/0301275 | A1 * | 11/2012 | Suciu | C04B 37/001 415/115 |

FOREIGN PATENT DOCUMENTS

EP 2208860 A2 7/2010
EP 2236767 A2 10/2010

OTHER PUBLICATIONS

English Abstract for EP1264964A1—Dec. 11, 2002; 1 pg.
European Search Report for Application No. 15195019.3-1610; dated Mar. 22, 2016; 7 pgs.
Official Communication from the European Patent Office for related EP Application No. 15195019.3 dated Jun. 5, 2018, 4 pages.

* cited by examiner

FIBER REINFORCED SPACER FOR A GAS TURBINE ENGINE

CROSS-REFERENCE TO RELATED APPLICATION

This application is a non-provisional patent application claiming the 35 USC § 119(e) priority benefit of U.S. Provisional Patent Application Ser. No. 62/080,861 filed on Nov. 17, 2014.

TECHNICAL FIELD

This disclosure generally relates to gas turbine engines and, more particularly, relates to a system for reinforcing a spacer.

BACKGROUND

Many modern aircraft, as well as other vehicles and industrial processes, employ gas turbine engines for generating energy and propulsion. Such engines include a fan, compressor, combustor and turbine provided in serial fashion, forming an engine core and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via a central rotating shaft. Energy from the combustion gases not used by the turbine is discharged through an exhaust nozzle, producing thrust to power the aircraft.

Gas turbine engines contain an engine core and fan surrounded by a fan case, forming part of a nacelle. The nacelle is a housing that contains the engine. The fan is positioned forward of the engine core and within the fan case. The engine core is surrounded by an engine core cowl and the area between the nacelle and the engine core cowl is functionally defined as a fan duct. The fan duct is substantially annular in shape to accommodate the airflow from the fan and around the engine core cowl. The airflow through the fan duct, known as bypass air, travels the length of the fan duct and exits at the aft end of the fan duct at an exhaust nozzle.

In addition to thrust generated by combustion gasses, the fan of gas turbine engines also produces thrust by accelerating and discharging ambient air through the exhaust nozzle. Various parts of the gas turbine engine generate heat while operating, including the compressor, combustor, turbine, central rotating shaft and fan. To maintain proper operational temperatures, excess heat is often removed from the engine via oil coolant loops, including air/oil or fuel/oil heat exchangers, and dumped into the bypass airflow for removal from the system.

The compressor includes a number of rotors arranged along the central longitudinal axis. The rotors may each include a plurality of blades, which define a substantially annular flow path for incoming and compressed air. The rotors may be separated by spacers, which also may attach to each rotor. The spacers or rotors may also attach to the central rotating shaft.

As the gas turbine engine operates, the rotors and spacers may rotate along with the central rotating shaft. This rotation creates forces which can deform, expand, contract or translate certain gas turbine engine components, including spacers. These forces may be a function of rotational speed, temperature, pressure, mass or radial distance from the central longitudinal axis. Spacers constructed of a single material, or without a reinforcing apparatus, may suffer from poor deformation, expansion, contraction or translation properties during operation. They may also necessitate compromises in system weight or packaging. Further, it may be difficult to accurately control or predict the degree of deformation or translation.

Accordingly, there is a need for an improved spacer for a gas turbine engine.

SUMMARY OF THE DISCLOSURE

To meet the needs described above, the present disclosure provides a rotary disk for use in a gas turbine engine that may comprise a rotor that includes or is adapted to include respective blades, a spacer adjacent to the rotor for positioning the rotor, and the spacer comprising a fiber reinforced composite material.

The fiber reinforced composite material may be an organic matrix composite or a metal matrix composite, and may circumscribe the spacer or may be encapsulated by the spacer. The fiber may be cured with the substrate after the fiber is wound around the spacer, or before the fiber reinforced composite material is placed around the spacer. The fiber reinforced composite material may be retained on the spacer using a retention mechanism.

The present disclosure also provides a gas turbine engine that may include a compressor comprising a rotary disk, the rotary disk comprising a rotor that includes or is adapted to include respective blades, a spacer adjacent to the rotor for positioning the rotor, the spacer comprising a fiber reinforced composite material, a combustor downstream of the compressor, and a turbine downstream of the combustor.

The fiber reinforced composite material may be an organic matrix composite, a metal matrix composite or may include both a metal matrix composite and an organic matrix composite. Further, the fiber reinforced composite material may circumscribe the spacer or be encapsulated by the spacer. A retention mechanism may be used to retain the fiber reinforced composite material on the spacer. The one or more rotors may be bladed rings, bladed rotors or integrally bladed rotors.

The present disclosure further provides a method for reinforcing a spacer of a gas turbine engine that may comprise including a fiber and a substrate, operatively associating the substrate and fiber to form a fiber reinforced composite material, including a rotary disk, the rotary disk comprising a rotor that includes or is adapted to include respective blades and a spacer adjacent to the rotor for positioning the rotor, and reinforcing the spacer with the fiber reinforced composite material. The fiber reinforced composite material may be encapsulated by the spacer.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION OF THE INVENTION

Figure 1:
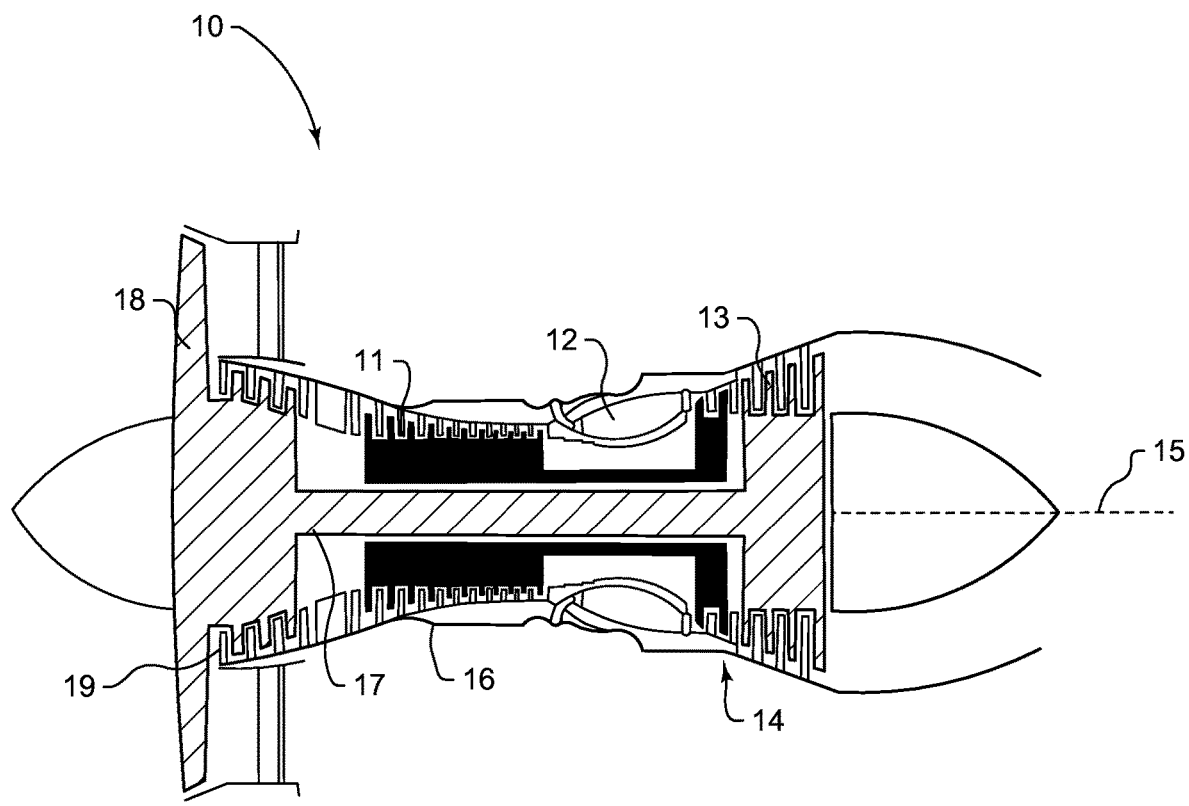
FIG. 1 is a sectional view of a gas turbine engine constructed in accordance with the present disclosure.

Turning now to the drawings, and with specific reference to FIG. 1, a gas turbine engine constructed in accordance with the present disclosure is generally referred to by reference numeral 10. The gas turbine engine 10 includes a compressor 11, combustor 12 and turbine 13, known as the engine core 14, lying along a central longitudinal axis 15, and surrounded by an engine core cowl 16. The compressor 11 is connected to the turbine 13 via a central rotating shaft 17. Additionally, in a typical multi-spool design, plural turbine 13 sections are connected to, and drive, corresponding plural sections of the compressor 11 and a fan 18 via the central rotating shaft 17, enabling increased compression efficiency.

As is well known by those skilled in the art, ambient air enters the compressor 11 at an inlet 19, is pressurized, and is then directed to the combustor 12, mixed with fuel and combusted. This generates combustion gases that flow downstream to the turbine 13, which extracts kinetic energy from the exhausted combustion gases. The turbine 13, via central rotating shaft 17, drives the compressor 11 and the fan 18, which draws in ambient air.

Figure 2:
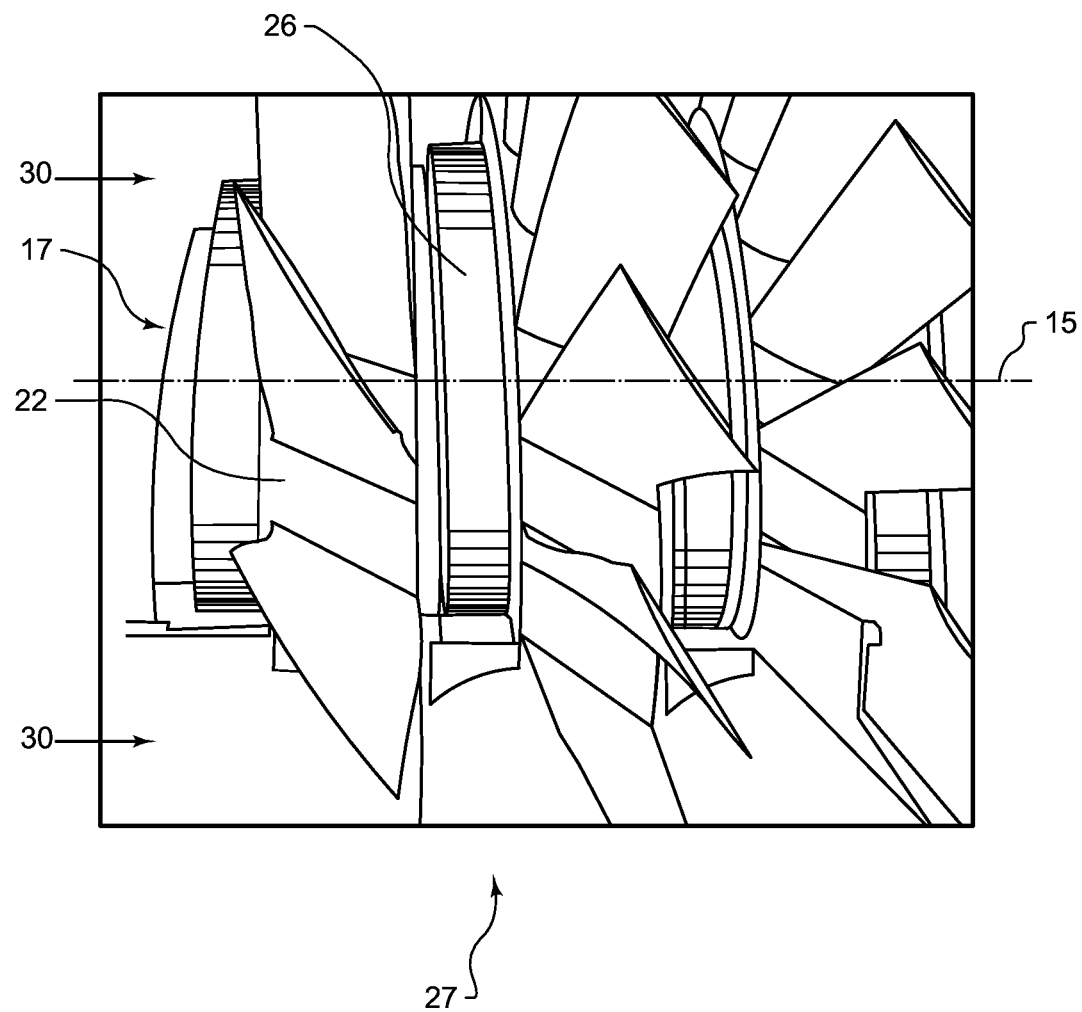
FIG. 2 is a side view of a compressor assembly constructed in accordance with the present disclosure.

Thrust is produced both by ambient air accelerated aft by the fan 18 and by exhaust gasses exiting from the engine core 14. The compressor 11 may include one or more rotors 22 arranged along the central longitudinal axis 15, as shown in FIG. 2. The rotors 22 may be separated by one or more spacers 26, and the spacers 26 may also attach to each corresponding rotor 22. A rotary disk 27 is also shown, and may comprise a rotor 22 and a spacer 26 adjacent to the rotor 22 for positioning the rotor 22. Further, the rotor 22 may be connected to the central rotating shaft 17 by the spacer 26. The rotary disk 27 may also comprise a pair of rotors 22 and a spacer 26 extending between the rotors 22 for separating the rotors 22. The rotors 22 may define a substantially annular flow path 30 for incoming and compressed air, as shown by arrows in FIG. 2.

As the gas turbine engine 10 operates, the rotors 22 and spacers 26 may rotate along with the central rotating shaft 17. This rotation creates forces which may deform, expand, contract, or translate certain gas turbine engine 10 components, including spacers 26. This can adversely affect gas turbine engine 10 performance and produce unwanted stresses.

Figure 3:
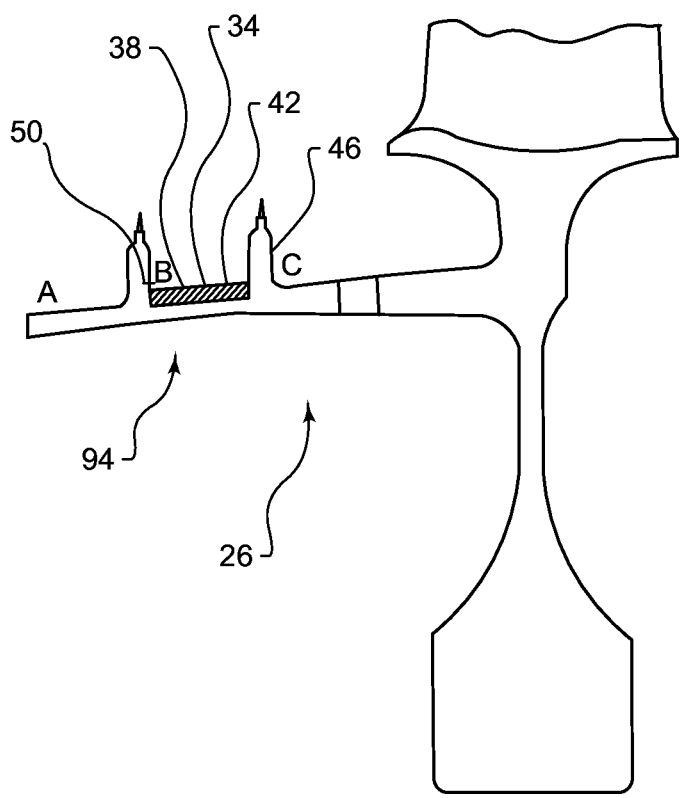
FIG. 3 is a schematic sectional view of a spacer reinforced by a fiber as described in the present disclosure.
Figure 4:
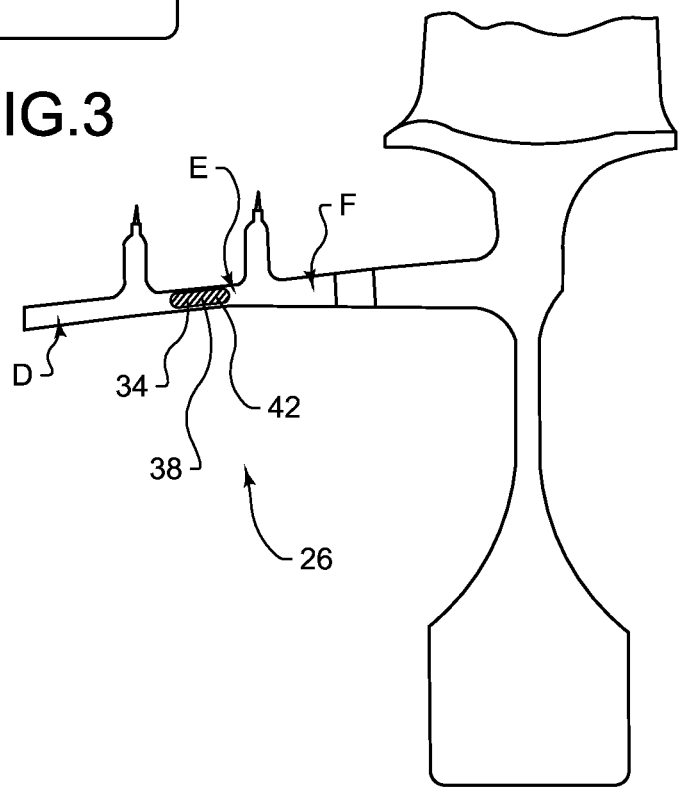
FIG. 4 is a schematic sectional view of another embodiment of a spacer reinforced by a fiber as described in the present disclosure.

To counter these forces, the spacer 26 may be reinforced using a layer of fiber 34 operatively associated with a substrate 38, as shown in FIGS. 3-4. The fiber 34 may be combined with the substrate 38, to form a composite material 42. The composite material 42 can be formed by curing the fiber 34 with the substrate 38, and may be a fiber reinforced composite material. The composite material 42 may have certain properties, including strength in tension, strength in compression, temperature resistance, electrical resistance or vibrational absorption beneficial to the operation of the gas turbine engine 10. The spacer 26 may also include seals 46 to limit airflow to desired areas.

The composite material 42 may circumscribe the spacer 26, as shown in FIG. 3, and may use a retention mechanism 50 to limit radially outward movement during operation. The retention mechanism 50 may comprise a clamp, bolt, rivet, adhesive, screw, metal retention apparatus or another mechanism commonly known in the art. Further, the composite material 42 may be located at different points on the spacer 26, indicated by reference letters A, B and C.

Figure 7:
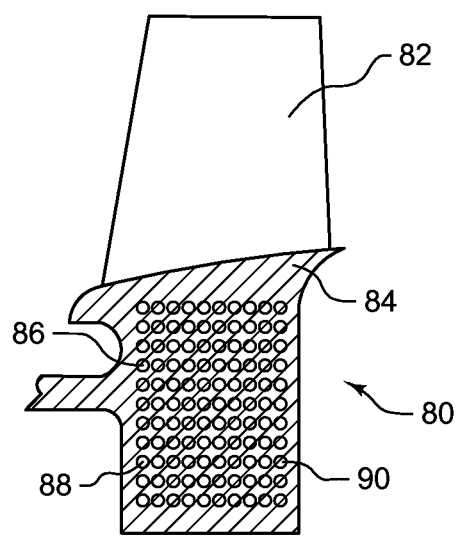
FIG. 7 is a sectional view of a bladed ring constructed in accordance with the present disclosure.

In another embodiment, the composite material 42 may also be encapsulated in the spacer 26, as shown in FIG. 7, so that the composite material 42 is completely surrounded by the spacer 26. As with the preceding embodiment, the composite material 42 may be located at different points within the spacer 26, indicated by reference letters D, E and F.

The composite material 42 may be or include an organic matrix composite or a metal matrix composite. The composite material 42 may also include both organic matrix composites and metal matrix composites. Different properties, including strength, ease of manufacture and heat resistance can be prioritized based on the specific application. The fiber 34 may be a ceramic, wood, polymer, carbon, metal or aramid material. The substrate 38 may be a metal, ceramic or polymer.

The fiber 34 and substrate 38 may be cured to form a composite material 42 after the fiber 34 is wound around the spacer 26, as best shown in FIG. 3. This process may ensure a better fit on the spacer 26, and may also save costs and time as compared with transporting and subsequently fitting the composite material 42 to the spacer 26.

Alternatively, the fiber 34 and substrate 38 may be cured into a composite material 42 before the composite material 42 is placed around the spacer 26. This may allow a more precise shaping or manufacture of the composite material 42, and may avoid any potential damage or alteration to the spacer 26 during the curing process.

The composite material 42 may be a pre-impregnated material, where the fiber 34 is operatively associated with the substrate 38 before the fiber 34 is formed into its functional shape. Alternatively, the composite material 42 may be a resin transfer molding material, where the fiber 34 is operatively associated with the substrate 38 after the fiber 34 is formed into its functional shape.

Figure 5:
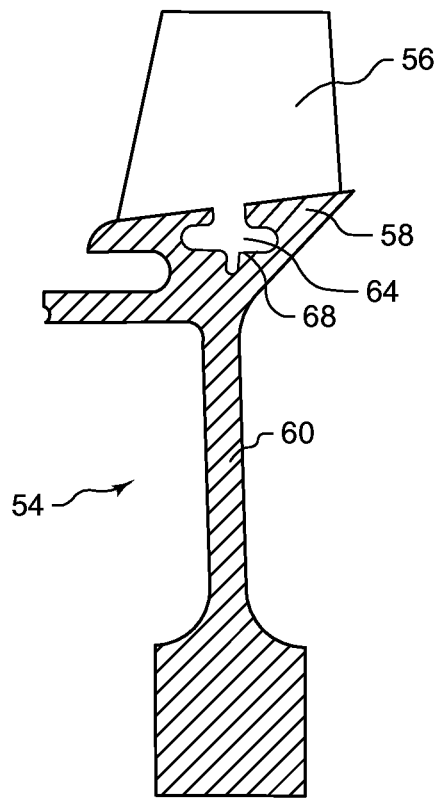
FIG. 5 is a sectional view of a bladed rotor constructed in accordance with the present disclosure.

The rotor 22 may be in the form of a bladed rotor 54, as shown in FIG. 5, and is shown as including a bladed rotor rim 58, a bladed rotor web 60 and a bladed rotor blade 56. The bladed rotor blade 56 may exist as a distinct part from the bladed rotor 54 to enable easy replacement, if needed. Additionally, the bladed rotor blade 56 may include a tab 64 which hooks the bladed rotor blade 56 to a bladed rotor rim 58 by way of a notch 68.

Figure 6:
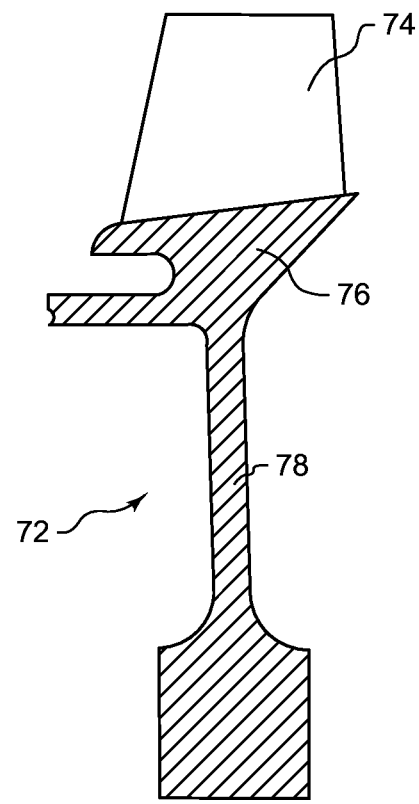
FIG. 6 is a sectional view of an integrally bladed rotor constructed in accordance with the present disclosure.

In another variant, the rotor 22 may be in the form of an integrally bladed rotor (IBR) 72. The integrally bladed rotor 72 is shown as including an IBR blade 74, an IBR rim 76 and an IBR web 78, as shown in FIG. 6. However, as opposed to the bladed rotor 54 of FIG. 5, the integrally bladed rotor 72 and IBR blade 74 are not distinct parts.

As a further rotor 22 variant, a bladed ring 80 of FIG. 7 is integrally bladed and further includes a bladed ring fiber 86 and a bladed ring substrate 88. More specifically, the bladed ring 80 may be reinforced with the bladed ring fiber 86 and the bladed ring substrate 88, which may be cured to form a bladed ring composite material 90. The bladed ring 80 is also shown to include a bladed ring blade 82 and a bladed ring rim 84.

Figure 8:
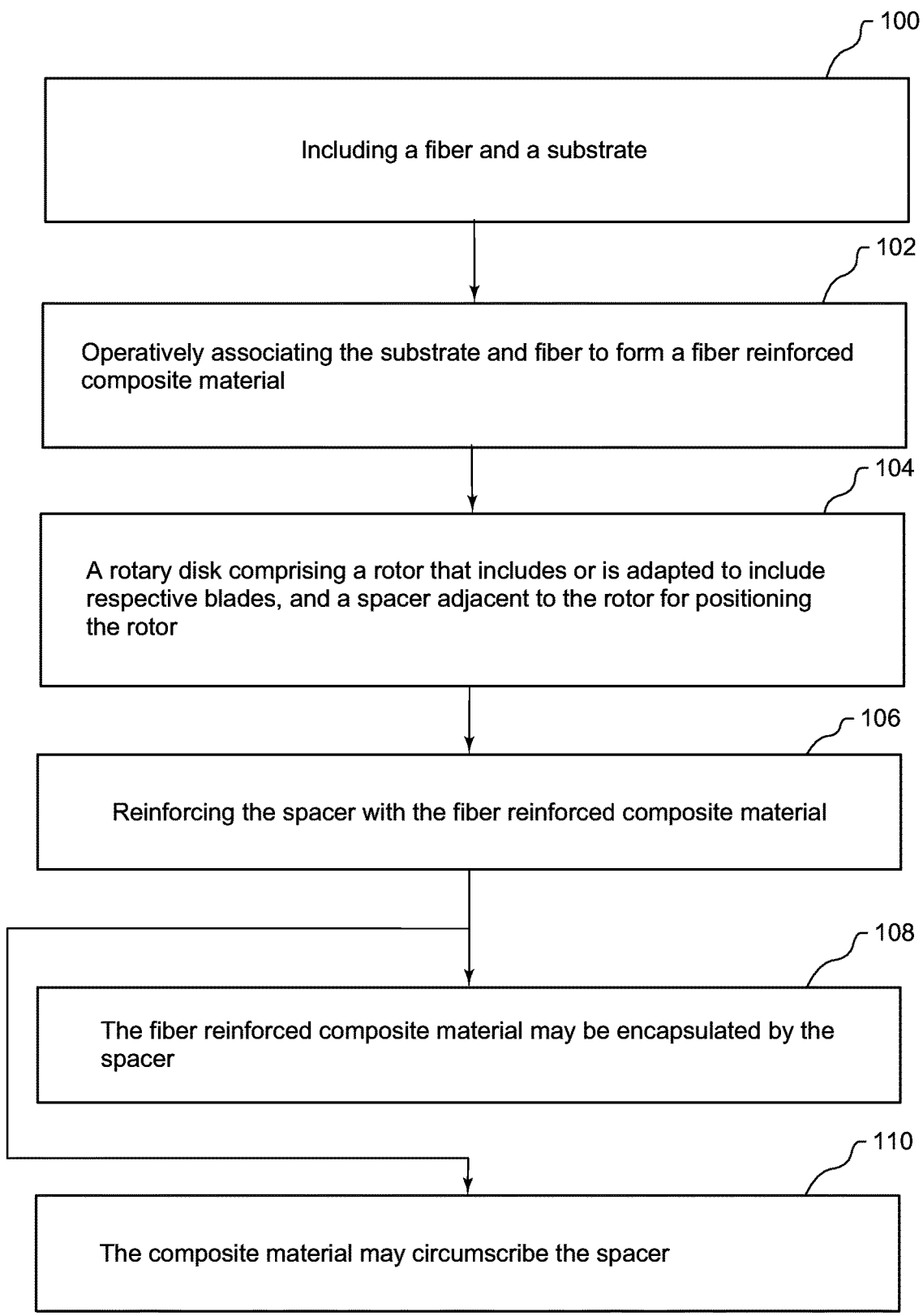
FIG. 8 is a flowchart depicting a sample sequence of steps which may be practiced using the teachings of the present disclosure.

A method for reinforcing a spacer can best be understood by referencing the flowchart in FIG. 8. The method may comprise including a fiber and a substrate 100, operatively associating the substrate and fiber to form a fiber reinforced composite material 102, providing a rotary disk comprising a pair of rotors that include or are adapted to include respective blades and a spacer extending between the rotors for separating rotors 104, and reinforcing the spacer with the fiber reinforced composite material 106. The fiber reinforced composite material may be encapsulated by the spacer 108. Alternatively, the composite material may circumscribe the spacer as shown in step 110.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

In operation, the present disclosure sets forth a spacer system 94, as shown in FIG. 3, which can find industrial applicability in a variety of settings. For example, the disclosure may be advantageously employed in reinforcing various parameters and characteristics within a gas turbine engine 10. More specifically, the spacer 26 can be reinforced with a fiber 34. The fiber 34 can be cured with a substrate 38 to form a composite material 42.

As the gas turbine engine 10 operates, the rotation creates forces which can deform, expand, contract or translate certain gas turbine engine 10 components, including spacers 26. These forces can adversely affect gas turbine engine 10 performance and reliability. Accordingly, spacers 26 may be designed to reduce strain in response to these forces. Reinforcing a spacer 26 with a fiber 34 may allow a lower system weight, more compact or configurable internal packaging or a high degree of reinforcement relative to the total spacer 26 size and weight.

The spacer system 94 of the present disclosure contributes to a gas turbine engine's 10 continued and efficient operation. The disclosed spacer system 94 may be original equipment on new gas turbine engines 10, or added as a retrofit to existing gas turbine engines 10.

What is claimed is:

1. A rotary disk for use in a gas turbine engine, comprising:
a rotor including bladed rotor blades and a bladed rotor rim defining a notch, each of the bladed rotor blades having a tab that hooks with the notch to connect the bladed rotor blade to the bladed rotor rim;
a spacer including first and second seals and located adjacent to the rotor for positioning the rotor; and
a fiber reinforced composite material of a material different than a material of the first and second seal, the fiber reinforced composite material being operatively associated with the spacer to reinforce the spacer, the fiber reinforced composite material being disposed between the first and second seals without extending past either of the seals.

2. The rotary disk of claim 1, wherein the fiber reinforced composite material is an organic matrix composite.

3. The rotary disk of claim 1, wherein the fiber reinforced composite material is a metal matrix composite.

4. The rotary disk of claim 1, wherein the fiber reinforced composite material circumscribes the spacer.

5. The rotary disk of claim 1, wherein the fiber reinforced composite material includes a fiber and a substrate, and the fiber is cured with the substrate after the fiber is wound around the spacer.

6. The rotary disk of claim 1, wherein the fiber reinforced composite material includes a fiber and a substrate, and the fiber is cured with the substrate before the fiber reinforced composite material is placed around the spacer.

7. The rotary disk of claim 1, wherein the fiber reinforced composite material is retained on the spacer using a retention mechanism.

8. A gas turbine engine, comprising:
a compressor including a rotary disk, the rotary disk comprising a rotor that includes or is adapted to include blades supported by a rotor rim, the blades being configured to define an integrally bladed rotor,
a spacer adjacent to the rotor for positioning the rotor and including a first seal, a second seal, and one or more arc regions;
a fiber reinforced composite material being of a material different than a material of the first seal and the second seal, the fiber reinforced composite material being operatively associated with the spacer to reinforce the spacer, the fiber reinforced composite material being disposed between the first seal and the second seal without extending past either of the seals;
a combustor downstream of the compressor; and
a turbine downstream of the combustor.

9. The gas turbine engine of claim 8, wherein the fiber reinforced composite material is an organic matrix composite.

10. The gas turbine engine of claim 8, wherein the fiber reinforced composite material is a metal matrix composite.

11. The gas turbine engine of claim 8, wherein the fiber reinforced composite material includes both a metal matrix composite and an organic matrix composite.

12. The gas turbine engine of claim 8, wherein the fiber reinforced composite material circumscribes the spacer.

13. The gas turbine engine of claim 8, wherein the fiber reinforced composite material is retained on the spacer using a retention mechanism.

14. A method of reinforcing a spacer of a gas turbine engine, comprising: including a fiber and a substrate, operatively associating the substrate and fiber to form a fiber reinforced composite material; including a rotary disk, the rotary disk comprising a rotor that includes respective blades and a bladed rotor rim defining a notch, each of the blades having a tab that hooks with the notch to connect the blades to the bladed rotor rim, and a spacer including first and second seals and located adjacent to the rotor for positioning the rotor; and reinforcing the spacer with the fiber reinforced composite material, the fiber reinforced composite material of a material different than a material of the first and second seal, the fiber reinforced composite material being operatively associated with the spacer to reinforce the spacer, the fiber reinforced composite material being disposed between the first and second seals without extending past either of the seals.

\* \* \* \* \*